US011320953B2

(12) United States Patent
Lee et al.

(10) Patent No.: US 11,320,953 B2
(45) Date of Patent: May 3, 2022

(54) SENSING STRUCTURE

(71) Applicant: SAMSUNG DISPLAY CO., LTD., Yongin-si (KR)

(72) Inventors: Kyungsu Lee, Suwon-si (KR); Dong Jin Moon, Cheonan-si (KR); Jong-Hwa Kim, Yongin-si (KR); In Young Han, Hwaseong-si (KR)

(73) Assignee: SAMSUNG DISPLAY CO., LTD., Yongin-si (KR)

( * ) Notice: Subject to any disclaimer, the term of this patent is extended or adjusted under 35 U.S.C. 154(b) by 0 days.

(21) Appl. No.: 17/017,764

(22) Filed: Sep. 11, 2020

(65) Prior Publication Data

US 2021/0132742 A1    May 6, 2021

(30) Foreign Application Priority Data

Nov. 4, 2019    (KR) .................... 10-2019-0139807

(51) Int. Cl.
*G06F 3/044*    (2006.01)
*G06F 3/041*    (2006.01)

(52) U.S. Cl.
CPC .......... *G06F 3/0448* (2019.05); *G06F 3/0446* (2019.05); *G06F 3/04164* (2019.05); *G06F 2203/04103* (2013.01); *G06F 2203/04111* (2013.01)

(58) Field of Classification Search
CPC .. G06F 3/0448; G06F 3/04164; G06F 3/0446; G06F 2203/04103; G06F 2203/04111
See application file for complete search history.

(56) References Cited

U.S. PATENT DOCUMENTS

| | | | |
|---|---|---|---|
| 10,928,937 B2* | 2/2021 | Fang | G06F 3/0446 |
| 2010/0225629 A1* | 9/2010 | Wang | H05K 9/0064 |
| | | | 345/207 |
| 2011/0017524 A1* | 1/2011 | Chen | G06F 3/0445 |
| | | | 178/18.06 |
| 2014/0070875 A1* | 3/2014 | Dunphy | G06F 3/0447 |
| | | | 327/517 |
| 2016/0320876 A1* | 11/2016 | Son | G06F 3/0446 |
| 2018/0092166 A1* | 3/2018 | Kim | H01L 51/0097 |
| 2018/0335874 A1* | 11/2018 | Li | G06F 3/0412 |
| 2019/0227650 A1* | 7/2019 | Fang | G06F 3/0446 |
| 2020/0167037 A1* | 5/2020 | Lee | G06F 3/0445 |
| 2020/0194505 A1* | 6/2020 | Tang | H01L 51/5225 |
| 2021/0072865 A1* | 3/2021 | He | G06F 3/0446 |

FOREIGN PATENT DOCUMENTS

| | | |
|---|---|---|
| KR | 10-2015-0087940 | 7/2015 |
| KR | 10-2016-0072909 | 6/2016 |
| KR | 10-1773514 | 8/2017 |

* cited by examiner

*Primary Examiner* — Mihir K Rayan
(74) *Attorney, Agent, or Firm* — F. Chau & Associates, LLC

(57) ABSTRACT

A sensing structure includes: a substrate including a sensing area and a peripheral area located adjacent to the sensing area; a sensing electrode disposed in the sensing area of the substrate; and a first wire disposed in the peripheral area of the substrate, wherein the first wire is connected to the sensing electrode, and the first wire has at least one opening.

20 Claims, 8 Drawing Sheets

SENSING STRUCTURE

CROSS-REFERENCE TO RELATED APPLICATION(S)

This application claims priority under 35 U.S.C. § 119 to Korean Patent Application No. 10-2019-0139807, filed on Nov. 4, 2019 in the Korean Intellectual Property Office (KIPO), the disclosure of which is incorporated by reference herein in its entirety.

TECHNICAL FIELD

Exemplary embodiments of the present inventive concept relate generally to a sensing structure. More particularly, exemplary embodiments of the present inventive concept relate to the sensing structure including a wire.

DISCUSSION OF THE RELATED ART

A sensing structure may be an input device of a display device. For example, the sensing structure may replace a mouse or a keyboard. An example of a sensing structure is a capacitive sensing structure (e.g., a mutual capacitive sensing structure or a self capacitive sensing structure) which is currently under development. The capacitive sensing structure may generally include a sensing electrode and a wire for applying a voltage to the sensing electrode. When a user's finger or the like touches a portion of the display device where the sensing electrode is located, the user's touch and a position of the touch may be detected by a change in a capacitance between the sensing electrodes of the capacitive sensing structure.

In addition, a wire may be disposed between a pad of the sensing structure and the sensing electrode to apply the voltage to the sensing electrode. The wire may have a structure in which an upper wire and a lower wire are stacked to be more stably disposed. Further, the wire has a structure in which a width becomes wider as it moves away from the pad to reduce an electrical resistance of the wire. However, as the display device increases in size, the width of the wire (e.g., the upper wire and the lower wire) increases, and thus the upper wire and the lower wire may be separated from each other.

SUMMARY

According to an exemplary embodiment of the present inventive concept, a sensing structure includes: a substrate including a sensing area and a peripheral area located adjacent to the sensing area; a sensing electrode disposed in the sensing area of the substrate; and a first wire disposed in the peripheral area of the substrate, wherein the first wire is connected to the sensing electrode, and the first wire has at least one opening.

In an exemplary embodiment of the present inventive concept, the at least one opening has a polygonal shape extending along a longitudinal direction of the first wire.

In an exemplary embodiment of the present inventive concept, the first wire includes: a first extending part located adjacent to a first side of the at least one opening; and a second extending part located adjacent to a second side of the at least one opening.

In an exemplary embodiment of the present inventive concept, wherein each of the first and second extending parts has a first width extending in a first direction, and extends in a second direction parallel to the at least one opening, and wherein the second direction crosses the first direction.

In an exemplary embodiment of the present inventive concept, the at least one opening has a second width less than the first width.

In an exemplary embodiment of the present inventive concept, the first wire further includes a connecting part connecting the first and second extending parts to each other, and wherein the first extending part, the second extending part, and the connecting part are integrally formed.

In an exemplary embodiment of the present inventive concept, the connecting part connects a distal end of each of the first and second extending parts to each other.

In an exemplary embodiment of the present inventive concept, the at least one opening includes: a first opening; and a second opening spaced apart from the first opening in a first direction, wherein the second opening extends parallel to the first opening.

In an exemplary embodiment of the present inventive concept, the first wire includes: a first extending part located adjacent to the first opening; a second extending part located between the first opening and the second opening; and a third extending part located adjacent to the second opening.

In an exemplary embodiment of the present inventive concept, the first wire further includes a connecting part connecting the first, second, and third extending parts to each other, and wherein the first extending part, the second extending part, the third extending part, and the connecting part are integrally formed.

In an exemplary embodiment of the present inventive concept, the connecting part connects a distal end of each of the first, second, and third extending parts to each other.

In an exemplary embodiment of the present inventive concept, the substrate further includes a pad area, wherein the peripheral area includes a first peripheral area and a second peripheral area located between the first peripheral area and the pad area, wherein the first wire has a third width, extending in a first direction, located in the second peripheral area and a fourth width, extending in the first direction, located in the first peripheral area, and wherein the fourth width is greater than the third width.

In an exemplary embodiment of the present inventive concept, the at least one opening is formed in a portion of the first wire located in the first peripheral area, and the at least one opening is not formed in a portion of the first wire located in the second peripheral area.

In an exemplary embodiment of the present inventive concept, the first wire extends from the pad area in a second direction crossing to the first direction, and a width, extending in the first direction, of the first wire gradually increases as a distance from the pad area increases in the second direction.

In an exemplary embodiment of the present inventive concept, when the first wire extends from the pad area into the first peripheral area by passing through the second peripheral area and the width of the first wire in the first peripheral area is greater than a predetermined width, the at least one opening is formed in a portion of the first wire located in the first peripheral area.

In an exemplary embodiment of the present inventive concept, the portion of the first wire located in the first peripheral area includes: a first extending part located adjacent to a first side of the at least one opening; a second extending part located adjacent to a second side of the at least one opening; and a connecting part connecting the first and second extending parts to each other, and wherein the first extending part, the second extending part, and the connecting part are integrally formed.

In an exemplary embodiment of the present inventive concept, the connecting part connects a distal end of each of the first and second extending parts to each other.

In an exemplary embodiment of the present inventive concept, the sensing structure further including: a second wire disposed between the first wire and the substrate, wherein the second wire overlaps the first wire, wherein an upper surface of the second wire is exposed by the at least one opening.

In an exemplary embodiment of the present inventive concept, a thickness of the first wire is thicker than a thickness of the second wire.

In an exemplary embodiment of the present inventive concept, the sensing structure further including: a dummy wire disposed in the peripheral area of the substrate, wherein the dummy wire is spaced apart from the first wire, and has at least one opening.

BRIEF DESCRIPTION OF THE DRAWINGS

The above and other features of the present inventive concept will become more apparent by describing in detailed exemplary embodiments thereof with reference to the accompanying drawings, in which.

DETAILED DESCRIPTION OF THE EMBODIMENTS

Hereinafter, exemplary embodiments of the present inventive concept will be explained in detail with reference to the accompanying drawings.

Figure 1:
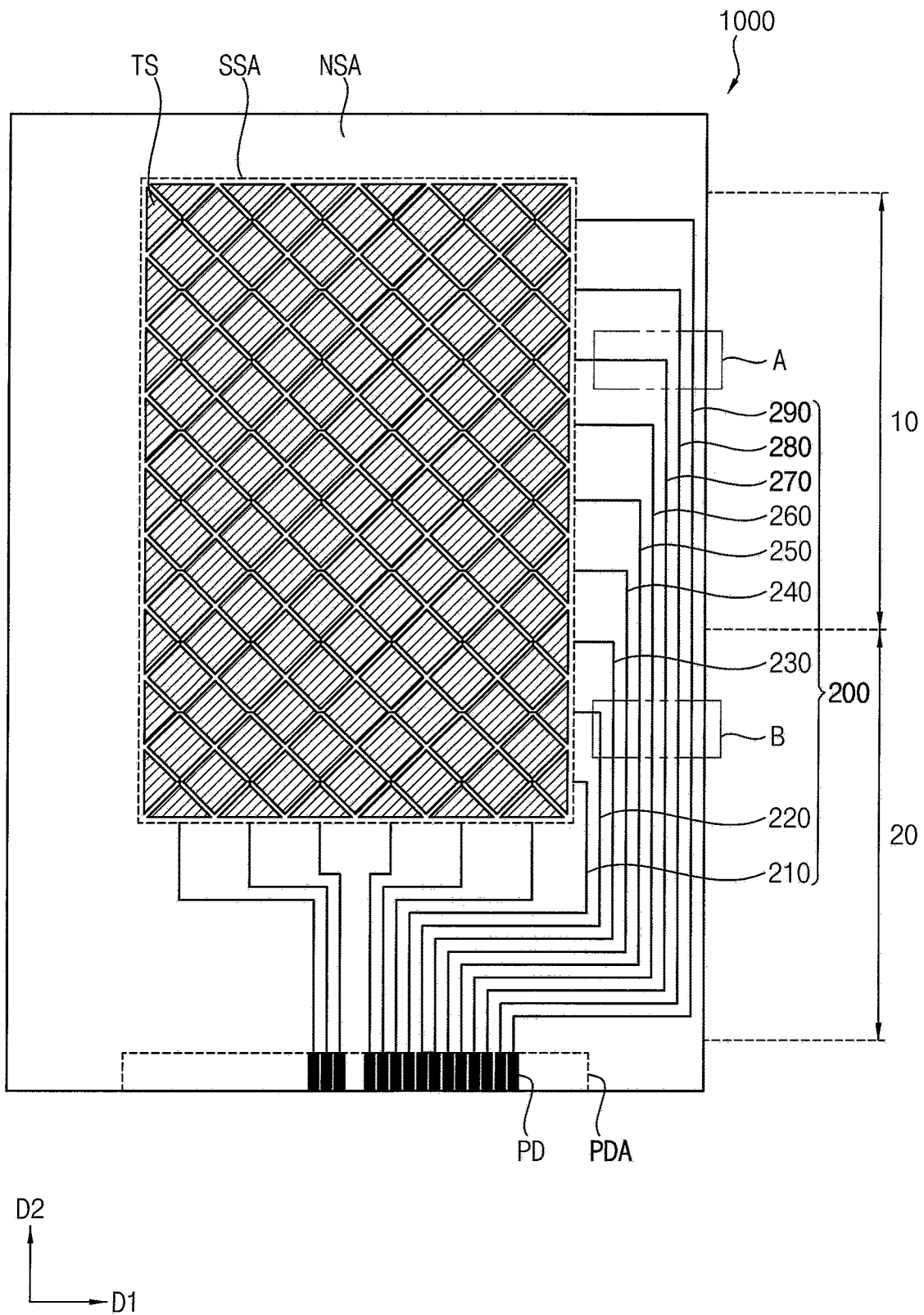
FIG. 1 is a plan view illustrating a sensing structure according to an exemplary embodiment of the present inventive concept.

FIG. 1 is a plan view illustrating a sensing structure according to an exemplary embodiment of the present inventive concept.

Referring to FIG. 1, the sensing structure 1000 may include a substrate, a sensing electrode TS, a pad PD, and a wire 200.

The substrate (for example, a substrate 100 of FIG. 4) may include a sensing area SSA, a peripheral area NSA, and a pad area PDA. In an exemplary embodiment of the present inventive concept, the sensing area SSA may be located at a central portion of the substrate, and the peripheral area NSA may be located outside of the sensing area SSA. For example, the peripheral area NSA may at least partially surround the sensing area SSA. The pad area PDA may be located outside of the sensing area SSA, and, for example, may be located at lower side of the sensing structure 1000, from a plan view.

The substrate may be formed of various materials capable of supporting the sensing electrode TS, the pad PD, and the wire 200. For example, the substrate may include a glass substrate, a quartz substrate, a plastic substrate, and the like. In an exemplary embodiment of the preset inventive concept, the substrate may have a structure in which at least one organic film layer and at least one barrier layer are alternately stacked. For example, the organic film layer may be formed using an organic material such as polyimide, and the barrier layer may be formed using an inorganic material.

The sensing electrode TS may be disposed in the sensing area SSA on the substrate. The sensing electrode TS may have a polygonal shape. For example, the sensing electrode TS may have a diamond shape as shown in FIG. 1.

In an exemplary embodiment of the present inventive concept, the sensing electrode TS may include first sensing patterns and second sensing patterns. The first sensing patterns may be disposed along a first direction D1 and connected to each other, and the second sensing patterns may be disposed along a second direction D2 crossing the first direction D1 and connected to each other. The first sensing patterns (hereinafter, referred to as a sensing electrode row) may be repeatedly arranged in the second direction D2. The second sensing patterns (hereinafter, referred to as a sensing electrode column) may be repeatedly arranged in the first direction D1.

The sensing electrode TS may receive a signal from the pad PD by passing through the wire 200. By providing the signal to the sensing electrode TS, a capacitance may be formed in the sensing electrode TS. For example, the first and second sensing patterns may be disposed in the same layer, and a passivation layer may be disposed between the first and second sensing patterns, so that the first and second sensing patterns may be insulated from each other. Thus, the capacitance may be formed between the first and second sensing patterns.

When a user's finger or the like touches a portion of a display device (e.g., a window of the display device) under which the sensing electrode TS is located, the capacitance of the sensing electrode TS may change. The sensing structure 1000 may detect whether the user has touched the display device, and if the user has touched the display device, the sensing structure 1000 may detect a position of the user's touch in the sensing area SSA through a change of the capacitance.

The wire 200 may be disposed in the peripheral area NSA on the substrate. As shown in FIG. 1, the wire 200 may be located in a right side of the sensing structure 1000, from a plan view. However, the present inventive concept is not limited thereto. For example, the wire 200 may be located in a left side or on an upper side of the sensing structure 1000, from a plan view.

The wire 200 may be disposed between the sensing electrode TS and the pad PD in the peripheral area NSA. Accordingly, the wire 200 may electrically connect the sensing electrode TS and the pad PD to each other. Thus, the wire 200 may provide the signal from the pad PD to the sensing electrode TS or may provide the change of the capacitance generated at the sensing electrode TS to the pad PD. To electrically connect the sensing electrode TS and the pad PD, the wire 200 may extend in the second direction D2

(or, e.g., a longitudinal direction), and may be spaced apart from each other in the first direction D1.

In an exemplary embodiment of the present inventive concept, the wire 200 may include first to ninth wires 210, 220, 230, 240, 250, 260, 270, 280, and 290. The first to ninth wires 210, 220, 230, 240, 250, 260, 270, 280, and 290 may extend from the pad area PDA in the second direction D2, and may be connected to the sensing electrode rows, respectively.

For example, the first wire 210 may be connected to the sensing electrode row closest to the pad area PDA, The second wire 220 may be connected to the sensing electrode row closest to the pad area PDA among the sensing electrode rows not connected to the first wire 210. For example, the second wire 220 is adjacent to the first wire 210. The third wire 230 may be connected to the sensing electrode row closest to the pad area PDA among the sensing electrode rows not connected to the first and second wires 210 and 220. For example, the second wire 220 may be between the first wire 210 and the third wire 230. The fourth wire 240 may be connected to the sensing electrode row closest to the pad area PDA among the sensing electrode rows not connected to the first to third wires 210, 220, and 230. For example, the fourth wire 240 may be adjacent to the third wire 230. In this way, the fifth to eighth wires 250, 260, 270, and 280 may be connected to the sensing electrode rows, respectively. In addition, the ninth wire 290 may be connected to the sensing electrode row furthest from the pad area PDA among the sensing electrode rows.

Figure 2:
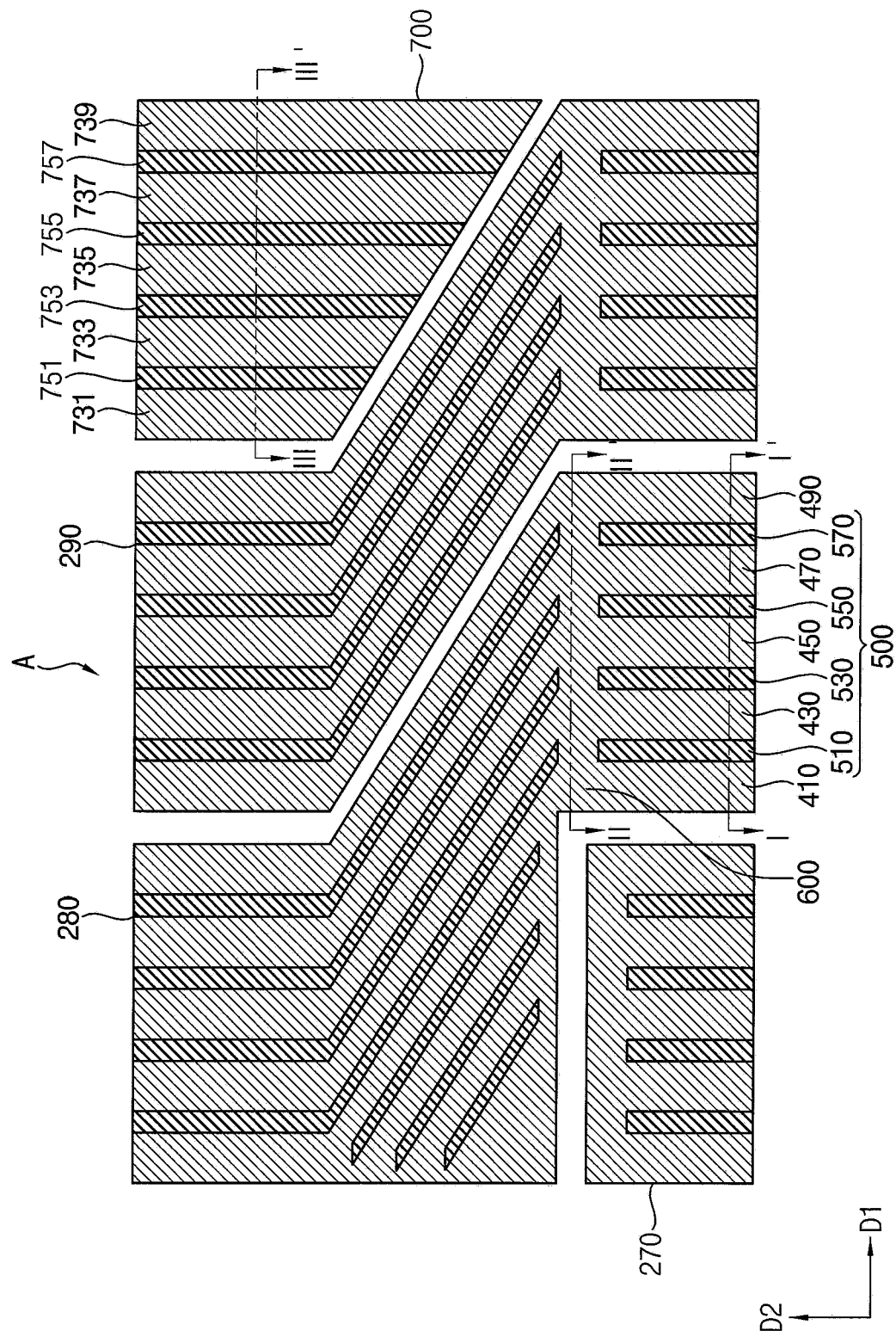
FIG. 2 is a partially enlarged plan view illustrating an area 'A' of FIG. 1.
Figure 3:
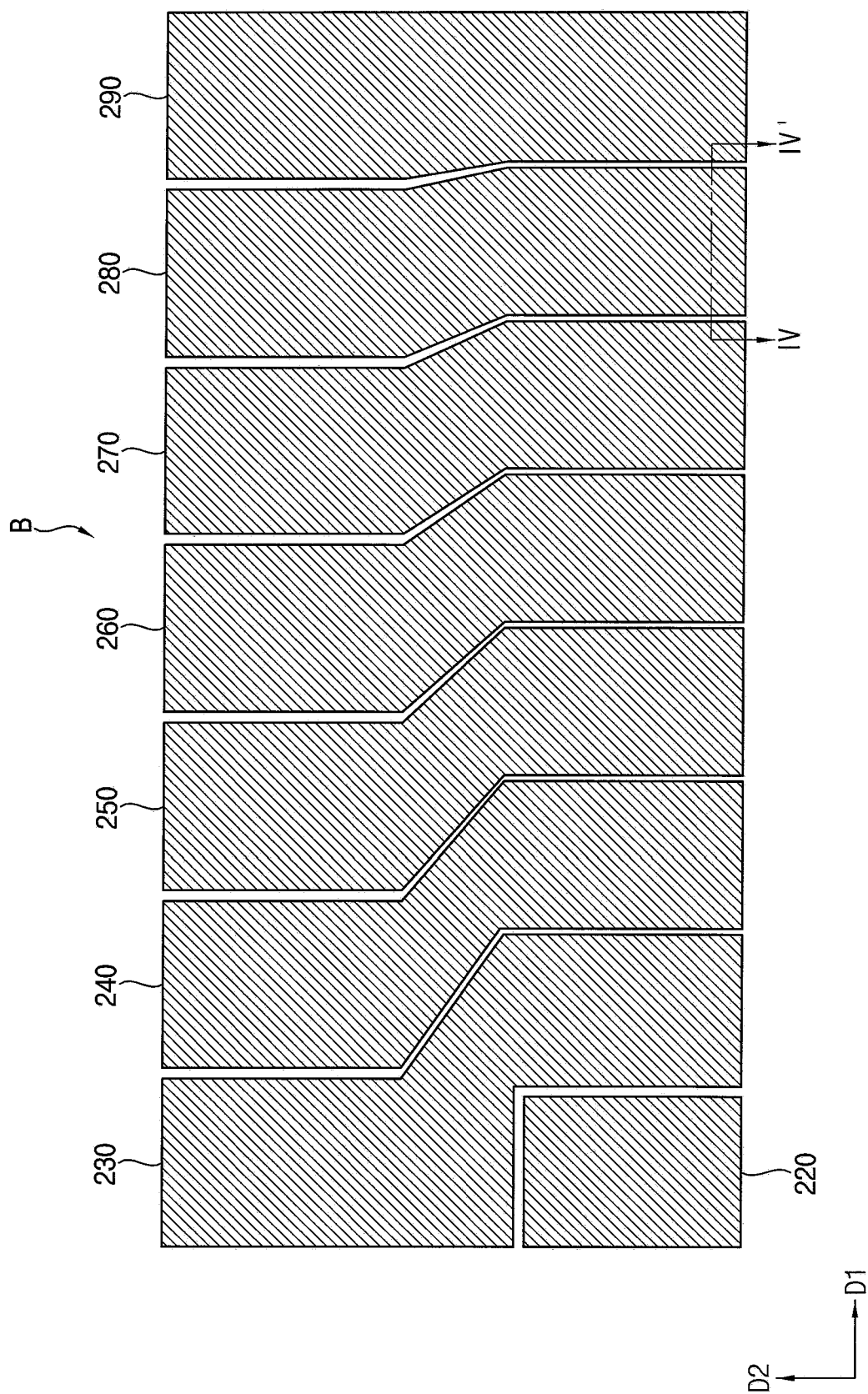
FIG. 3 is a partially enlarged plan view illustrating an area 'B' of FIG. 1.
Figure 4:
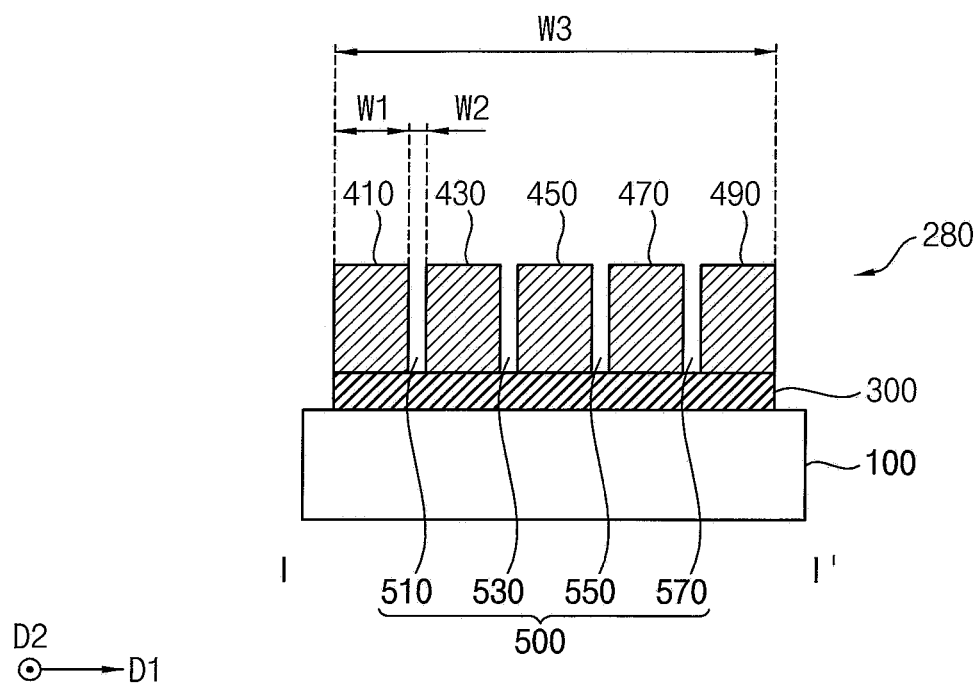
FIG. 4 is a cross-sectional view taken along line I-I' of FIG. 2.

FIG. 2 is a partially enlarged plan view illustrating an area 'A' of FIG. 1, FIG. 3 is a partially enlarged plan view illustrating an area 'B' of FIG. 1, and FIG. 4 is a cross-sectional view taken along line of FIG. 2.

Referring to FIGS. 1, 2, and 3, the peripheral area NSA includes a first peripheral area 10 and a second peripheral area 20 located between the first peripheral area 10 and the pad area PDA. For example, the first peripheral area 10 and the second peripheral area 20 may be defined by whether or not an opening 500 exists. For example, the opening 500 may exist in the first peripheral area 10, and may not exist in the second peripheral area 20.

Each of the fourth to ninth wires 240, 250, 260, 270, 280, and 290 may be connected to the sensing electrode rows in the first peripheral area 10, and each the first to third wires 210, 220, and 230 may be connected to the sensing electrode rows in the second peripheral area 20. Accordingly, a dummy wire 700 and the fourth to ninth wires 240, 250, 260, 270, 280, and 290 may be disposed in the first peripheral area 10, and the first to ninth wires 210, 220, 230, 240, 250, 260, 270, 280, and 290 may be disposed in the second peripheral area 20.

In addition, each of the sensing electrode rows may be disposed away from the pad area PDA in the second direction D2. For example, the sensing electrode row to which the ninth wire 290 is connected may be disposed farther from the pad area PDA than the sensing electrode row to which the first wire 210 is connected.

Accordingly, for the pad PD to provide the signal i) to the sensing electrode row to which the ninth wire 290 is connected and ii) to the sensing electrode row to which the first wire 210 is connected, or provide the pad PD with i) the change of the capacitance generated in the sensing electrode row to which the ninth wire 290 is connected and ii) the change of the capacitance generated in the sensing electrode row to which the first wire 210 is connected, a resistance of the first to ninth wires 210, 220, 230, 240, 250, 260, 270, 280, and 290 should be reduced as a distance away from the pad area PDA in the second direction D2 increases. To reduce the resistance of the first to ninth wires 210, 220, 230, 240, 250, 260, 270, 280, and 290, a width of each of the first to ninth wires 210, 220, 230, 240, 250, 260, 270, 280, and 290 may be gradationally increased along the second direction D2 as the distance from the pad area PDA increases.

The width of each of the fourth to ninth wires 240, 250, 260, 270, 280, and 290 disposed in the first peripheral area 10 may be greater than the width of each of the first to ninth wires 210, 220, 230, 240, 250, 260, 270, 280, and 290 disposed in the second peripheral area 20. In other words, a third width W3 of a portion of the eighth wire 280 disposed in the first peripheral area 10 may be greater than a fourth width W4 of a portion of the eighth wire 280 disposed in the second peripheral area 20.

For example, the width of each of the eighth and ninth wires 280, and 290 of an area A in which the seventh wire 270 is connected to the sensing electrode row may be about 100 um, and the width of each of the third to ninth wires 230, 240, 250, 260, 270, 280, and 290 of an area B in which the second wire 220 is connected to the sensing electrode row may be about 4 um.

In addition, the width of each of the fourth to ninth wires 240, 250, 260, 270, 280, and 290 may be gradationally increased in the first peripheral area 10 along the second direction D2. In other words, the width of the eighth wire 280 in an area in which the fourth wire 240 is connected to the sensing electrode row may be less than the width of the eighth wire 280 in an area in which the seventh wire 270 is connected to the sensing electrode row.

Figure 5:
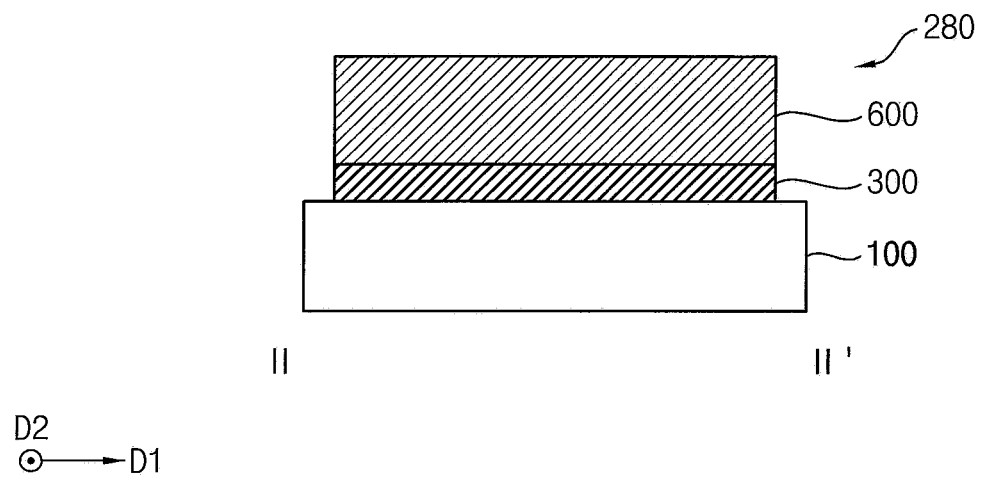
FIG. 5 is a cross-sectional view taken along line II-II' of FIG. 2.
Figure 6:
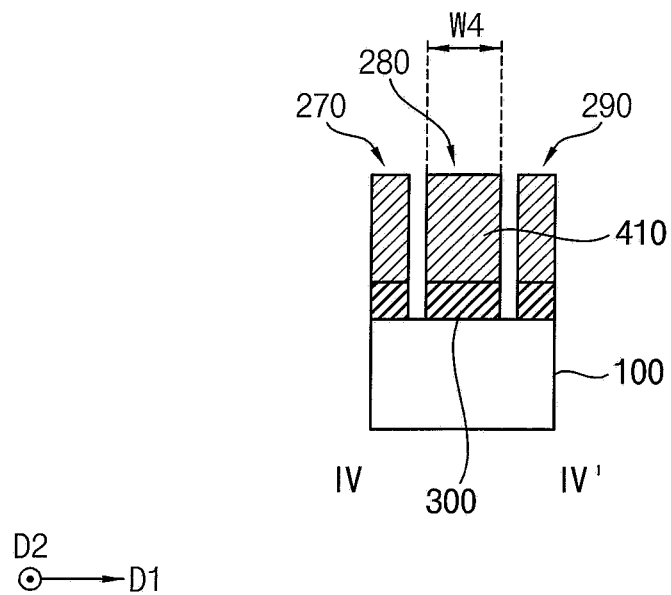
FIG. 6 is a cross-sectional view taken along line IV-IV' of FIG. 3.

FIG. 4 is a cross-sectional view taken along line I-I' of FIG. 3, FIG. 5 is a cross-sectional view taken along line II-II' of FIG. 2, and FIG. 6 is a cross-sectional view taken along line IV-IV' of FIG. 3.

Referring to FIGS. 1, 2, 3, 4, 5, and 6, the eighth wire 280 may include the substrate 100, a lower wire 300, and an upper wire disposed on the lower wire 300. Hereinafter, a structure of the eighth wire 280 may be described in detail, but a structure of each of the first to seventh wires 210, 220, 230, 240, 250, 260, and 270 and the ninth wire 290 may be substantially the same as the structure of the eighth wire 280.

The lower wire 300 may be disposed between the upper wire and the substrate 100. The lower wire 300 may extend along the second direction D2. In addition, a thickness of the upper wire is greater than a thickness of the lower wire 300.

The upper wire may extend along the second direction D2. In this case, the width of the lower wire 300 and the width of the upper wire may be substantially the same as the width of the eighth wire 280 as described above. For example, the width of a portion of the lower wire 300 disposed in the first peripheral area 10 may be greater than the width of a portion of the lower wire 300 disposed in the second peripheral area 20, and the width of a portion of the upper wire disposed in the first peripheral area 10 may be greater than the width of a portion of the upper wire disposed in the second peripheral area 20.

In addition, the upper wire may include first to fifth extending parts 410, 430, 450, 470, and 490, the opening 500, and a connecting part 600. In an exemplary embodiment of the present inventive concept, the upper wire may be formed by patterning a metal material after the metal material is deposited on the lower wire 300. In other words, the first to fifth extending parts 410, 430, 450, 470, and 490 and the connecting part 600 may be integrally formed and may be formed by forming the opening 500 in the metal material.

As described above, the opening 500 may be formed in the portion of the upper wire located in the first peripheral area 10, and may not be formed in the portion of the upper wire located in the second peripheral area 20.

For example, the width, which extends in the first direction D1, of the upper wire may be gradationally increased along the second direction D2. For example, the width of the portion of the upper wire disposed in the first peripheral area 10 may be greater than the width of the portion of the upper wire disposed in the second peripheral area 20. When the upper wire extends from the pad area PDA into the first peripheral area 10, passing through the second peripheral area 20, and the width of the portion of the upper wire in the first peripheral area 10 is greater than a predetermined width, the opening 500 may be formed in the portion of the upper wire located in the first peripheral area 10. As the opening 500 is formed in the upper wire, an upper surface of the lower wire 300 may be partially exposed.

In an exemplary embodiment of the present inventive concept, the opening 500 may be formed between adjacent extending parts 410, 430, 450, 470, and 490. For example, the opening 500 may have a polygonal shape (e.g., a rectangular shape) or a slit shape extending along the second direction D2. However, the present inventive concept is not limited thereto. Since the opening 500 is configured to reduce the width of the upper wire disposed on the lower wire 300 (or, e.g., to reduce an area of contact between the upper wire and the lower wire 300), a shape of the opening 500 may be variously set. For example, the opening 500 may have a varying width. However, the present inventive concept is not limited thereto.

The opening 500 may include first to fourth openings 510, 530, 550, and 570. In addition, the first to fifth extending parts 410, 430, 450, 470, and 490 may be formed by the first to fourth openings 510, 530, 550, and 570. For example, the first extending part 410 may be located at a first side of the first opening 510. The second extending part 430 may be located at a second side (e.g., an opposite side of the first side) of the first opening 510, and may also be located at a first side of the second opening 530. The third extending part 450 may be located at a second side of the second opening 530, and may also be located at a first side of the third opening 550. The fourth extending part 470 may be located at a second side of the third opening 550, and may also be located at a first side of the fourth opening 570. The fifth extending part 490 may be located at a second side of the fourth opening 570.

Each of the first to fifth extending parts 410, 430, 450, 470, and 490 may extend in the second direction D2, and may be spaced apart from each other in the first direction D1. For example, the first extending part 410 may be formed in the portion of the upper wire disposed in the second peripheral area 20. As described above, when the upper wire extends from the pad area PDA into the first peripheral area 10, by passing through the second peripheral area 20, and the width of the first extending part 410 in the first peripheral area 10 is greater than the predetermined width, the first opening 510 and the second extending part 430 may be formed in the portion of the upper wire located in the first peripheral area 10. For example, the width of the second extending part 430 of an area where the first opening 510 and the second extending part 430 are formed may be smaller than the width of the first extending part 410. In addition, the width of the second extending part 430 may be equal to the width of the first extending part 410 as the width of the upper wire is gradationally increased along the second direction D2. When the width of the second extending part 430 is greater than the predetermined width, the second opening 530 and the third extending part 450 may be further formed in the portion of the upper wire located in the first peripheral area 10. By repeating this process, the first to fifth extending parts 410, 430, 450, 470, and 490 may be formed in the portion of the upper wire located in the first peripheral area 10. For example, the predetermined width may be about 18 um.

In an exemplary embodiment of the present inventive concept, each of the first to fifth extending parts 410, 430, 450, 470, and 490 may have a first width W1 extending in the first direction D1. In this case, each of the first to fourth openings 510, 530, 550, and 570 may have a second width W2 extending in the first direction D1. For example, the first to fifth extending parts 410, 430, 450, 470, and 490 may be spaced apart from each other by the second width W2. In addition, in an exemplary embodiment of the present inventive concept, the second width W2 of the first opening 510 may be smaller than the first width W1 of the first extending part 410. In addition, the first width W1 may be the predetermined width, and the second width W2 may be about 4.6 um.

In an exemplary embodiment of the present inventive concept, the connecting part 600 may connect the first to fifth extending parts 410, 430, 450, 470, and 490, which are spaced apart from each other by the opening 500, to each other. For example, when any point of the fifth extending part 490 is damaged, the fifth extending part 490 may be connected to the first to fourth extending parts 410, 430, 450, and 470 by the connecting part 600. Accordingly, the signal may be provided to the fifth extending part 490, and a reliability of the sensing structure 1000 may be increased.

In an exemplary embodiment of the present inventive concept, the connecting part 600 may connect a distal end of each of the first to fifth extending parts 410, 430, 450, 470, and 490. In other words, the connecting part 600 may be disposed in an area where the seventh wire 270 is connected to the sensing electrode row. Since each of the first to fifth extending parts 410, 430, 450, 470, and 490 is more likely to be damaged at the distal end, the connecting part 600 may be disposed at the distal end to further increase the reliability of the sensing structure 100.

The sensing structure 1000 may prevent the upper wire and the lower wire 300 from being separated from each other by reducing the width of the upper wire disposed on the lower wire 300 (or, e.g., by reducing the area of contact between the upper wire and the lower wire 300) by including the opening 500 formed in the upper wire. Accordingly, the reliability of the sensing structure 1000 may be increased, and a short between wires due to a separated upper wire may be prevented.

Figure 7:
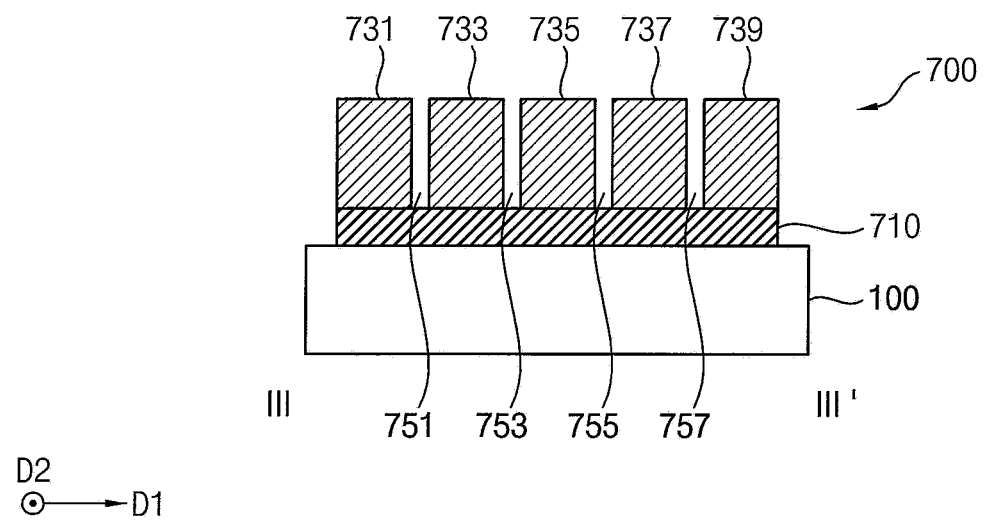
FIG. 7 is a cross-sectional view taken along line of FIG. 2.

FIG. 7 is a cross-sectional view taken along III-III' of FIG. 2.

Referring to FIGS. 1, 2, and 7, the sensing structure 1000 may further include a dummy wire 700. The dummy wire 700 may be disposed in the peripheral area NSA where the first to ninth wires 210, 220, 230, 240, 250, 260, 270, 280, and 290 are not disposed. For example, the dummy wire 700 may be spaced apart from the upper wire of each of the first to ninth wires 210, 220, 230, 240, 250, 260, 270, 280, and 290. In addition, the dummy wire 700 may be disposed in the pad area PDA.

As described above, the widths of the first to ninth wires 210, 220, 230, 240, 250, 260, 270, 280, and 290 may be set in consideration of electrical resistance. Accordingly, an area not covered by the first to ninth wires 210, 220, 230, 240, 250, 260, 270, 280, and 290 may exist in the peripheral area NSA. In this case, since the dummy wire 700 is disposed in the uncovered area, the dummy wire 700 may prevent a light leakage phenomenon in which a light emitted from a pixel is output through a bezel area of the display device.

In addition, the dummy wire 700 may be formed together with the first to ninth wires 210, 220, 230, 240, 250, 260, 270, 280, and 290. Accordingly, the dummy wire 700 may have a structure substantially the same as the structure of each of the first to ninth wires 210, 220, 230, 240, 250, 260, 270, 280, and 290.

For example, the dummy wire 700 may include the substrate 100, a lower dummy wire 710, and an upper dummy wire disposed on the lower dummy wire 710. The upper dummy wire may include first to fifth dummy extending parts 731, 733, 735, 737, and 739 and first to fourth dummy openings 751, 753, 755, and 757. Accordingly, the upper dummy wire may not be separated from the lower dummy wire 710.

Figure 8:
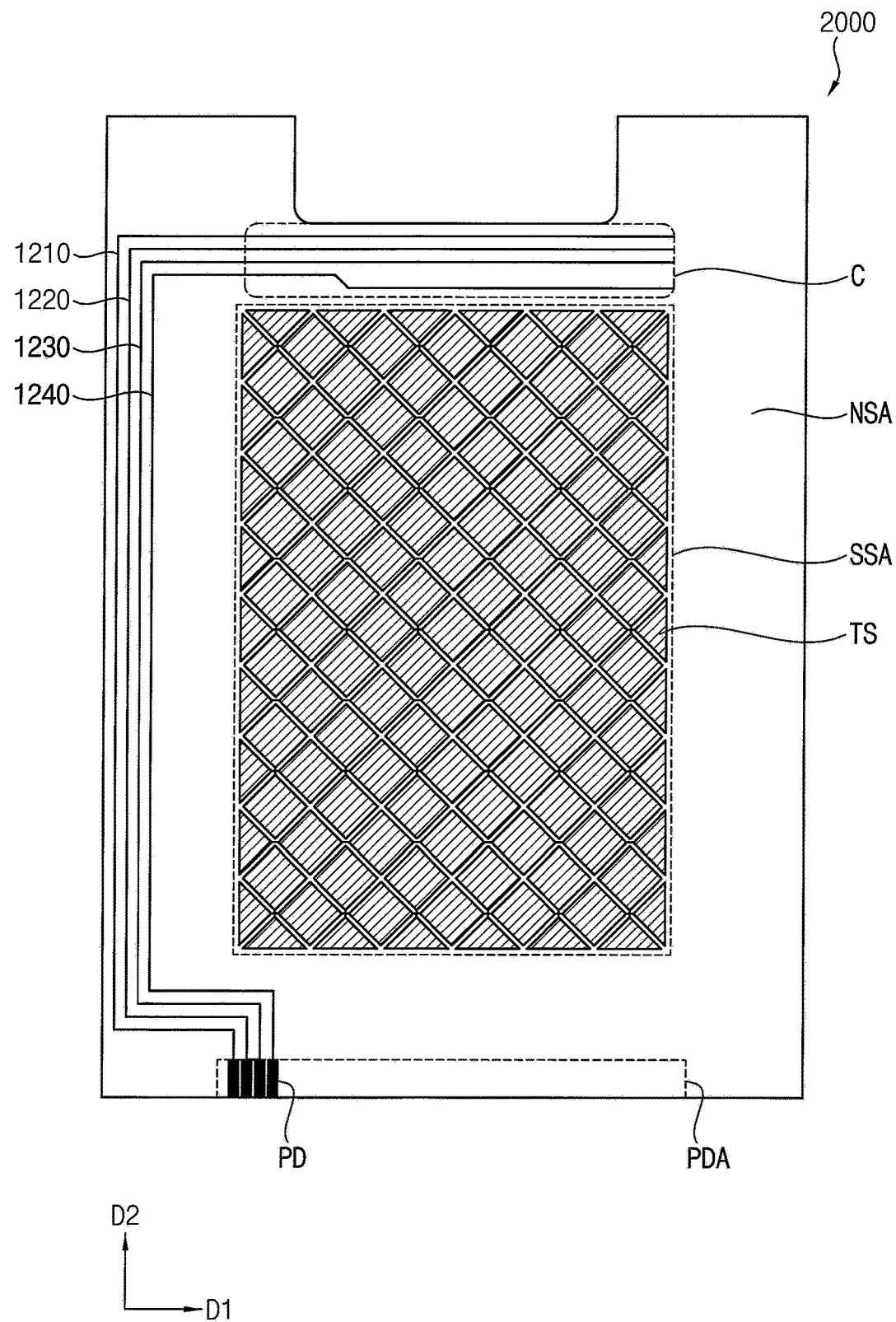
FIG. 8 is a plan view illustrating a sensing structure according to an exemplary embodiment of the present inventive concept.
Figure 9:
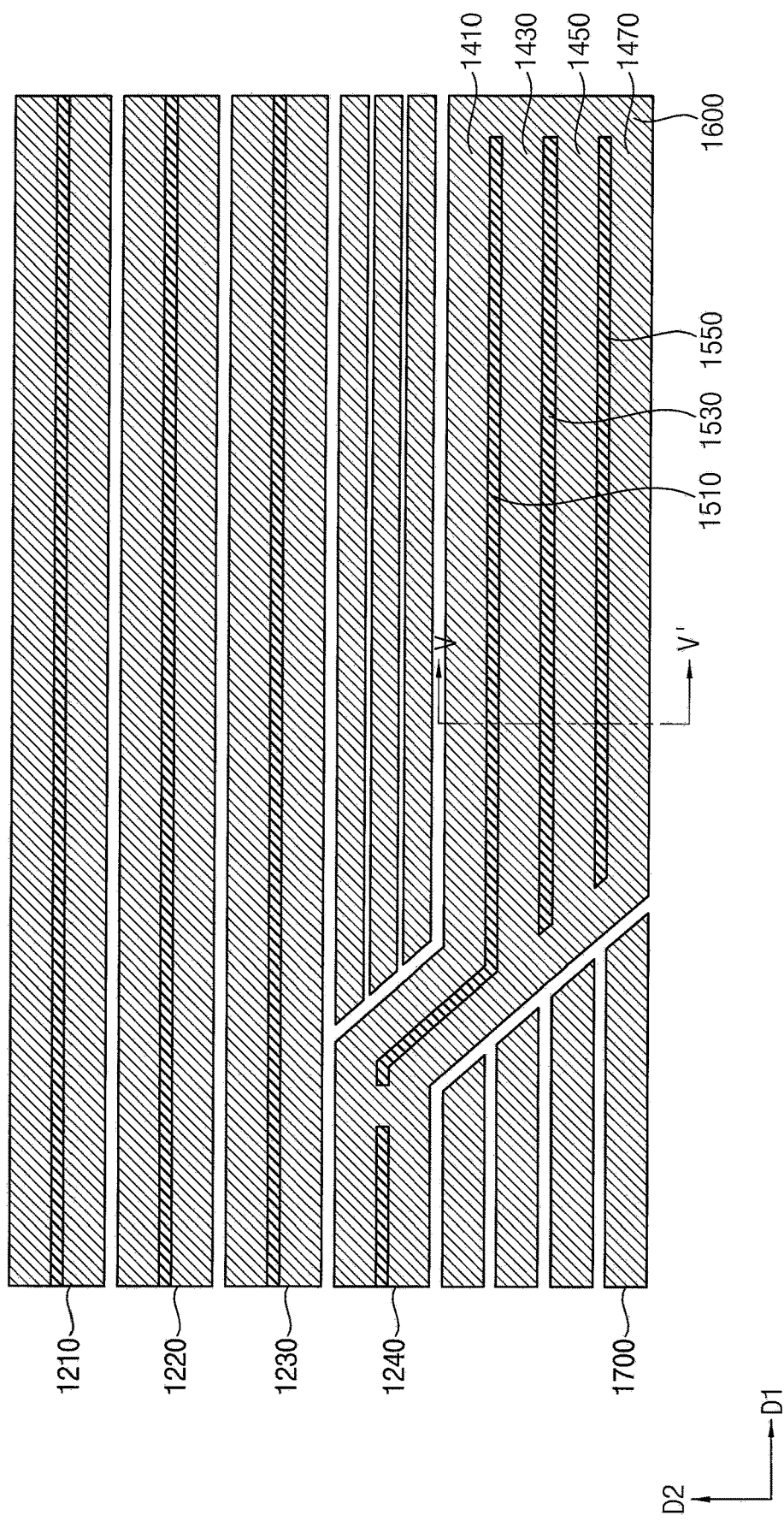
FIG. 9 is a partially enlarged plan view illustrating an area 'C' of FIG. 8.
Figure 10:
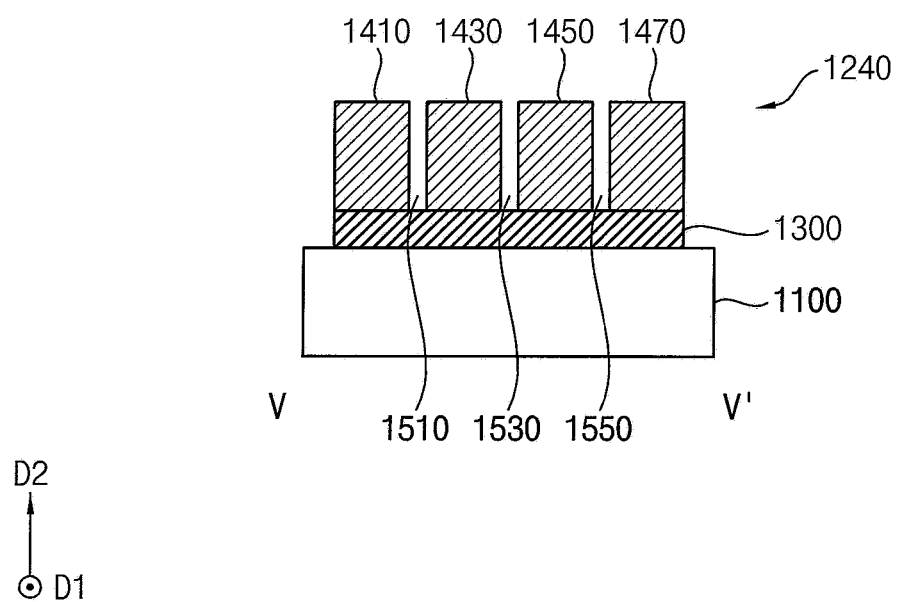
FIG. 10 is a cross-sectional view taken along line V-V' of FIG. 9.

FIG. 8 is a plan view illustrating a sensing structure according to an exemplary embodiment of the present inventive concept, FIG. 9 is a partially enlarged plan view illustrating an area 'C' of FIG. 8, and FIG. 10 is a cross-sectional view taken along line V-V' of FIG. 9.

Referring to FIGS. 8, 9, and 10, the sensing structure 2000 may include a substrate 100, a sensing electrode TS, a pad PD, and first to fourth wires 1210, 1220, 1230, and 1240.

However, since the sensing structure 2000 is substantially the same as the sensing structure 1000 described with reference to FIGS. 1 to 7 except for an area in which the first to fourth wires 1210, 1220, 1230, and 1240 are disposed, any descriptions that may be assumed to be repetitive may be omitted. Accordingly, hereinafter, the area in which the first to fourth wires 1210, 1220, 1230, and 1240 are disposed may be mainly described. In addition, a structure of each of the first to fourth wires 1210, 1220, 1230, and 1240 may be substantially the same as the structure of each of the first to ninth wires described with reference to FIGS. 1 to 7.

A concave trench may be formed in an upper side of the substrate 1100, from a plan view. For example, by concavely cutting and removing a portion of the upper side of the rectangular shaped substrate, the substrate 1100, on which the concave trench is formed, may be formed.

The first to fourth wires 1210, 1220, 1230, and 1240 and a dummy wire 1700 may be disposed on the upper side of the peripheral area NSA of the substrate 1100, from a plan view. The first to fourth wires 1210, 1220, 1230, and 1240 may connect the sensing electrode TS and the pad PD to each other.

As shown in FIG. 9, the first to fourth wires 1210, 1220, 1230, and 1240 may include at least one opening and a plurality of extending parts formed by the opening. For example, when the width of each of the first to fourth wires 1210, 1220, 1230, and 1240 is greater than a predetermined width, each of the first to fourth wires 1210, 1220, 1230, and 1240 may include at least one opening and at least one extending part.

For example, the fourth wire 1240 may include a lower wire 1300 and an upper wire disposed on the lower wire 1300. The upper wire may include first to fourth extending parts 1410, 1430, 1450, and 1470 and first to third openings 1510, 1530, and 1550.

In addition, the dummy wire 1700 may include at least one dummy opening and a plurality of dummy extending parts formed by the opening, depending on the width of the dummy wire 1700.

The sensing structure 2000 may prevent the upper wire and the lower wire 1300 from being separated from each other by reducing the width of the upper wire disposed on the lower wire 1300 (or, e.g., by reducing the area of contact between the upper wire and the lower wire 1300) by forming the first to third openings 1510, 1530, and 1550 in the upper wire. Accordingly, a reliability of the sensing structure 2000 may be increased, and a short between wires due to a separated upper wire may be prevented.

The present inventive concept may be applied to a display device and an electronic device using the display device. For example, the present inventive concept may be applied to a cellular phone, a smart phone, a video phone, a smart pad, a smart watch, a tablet PC, a car navigation system, a television, a computer monitor, a laptop, etc.

While the present inventive concept has been described with reference to exemplary embodiments thereof, it will be understood by those of ordinary skill in the art that various changes in form and details may be made thereto without departing from the spirit and scope of the present inventive concept.

What is claimed is:

1. A sensing structure comprising:
 a substrate including a sensing area and a peripheral area located adjacent to the sensing area;
 a sensing electrode disposed in the sensing area of the substrate; and
 a first wire disposed in the peripheral area of the substrate, wherein the first wire is connected to the sensing electrode, and the first wire has at least one opening that exposes a second wire vertically overlapping the first wire.

2. The sensing structure of claim 1, wherein the at least one opening has a polygonal shape extending along a longitudinal direction of the first wire.

3. The sensing structure of claim 1, wherein the first wire includes:
 a first extending part located adjacent to a first side of the at least one opening; and
 a second extending part located adjacent to a second side of the at least one opening.

4. The sensing structure of claim 3,
 wherein each of the first and second extending parts has a first width extending in a first direction, and extends in a second direction parallel to the at least one opening, and
 wherein the second direction crosses the first direction.

5. The sensing structure of claim 4, wherein the at least one opening has a second width less than the first width.

6. The sensing structure of claim 3, wherein the first wire further includes a connecting part connecting the first and second extending parts to each other, and
 wherein the first extending part, the second extending part, and the connecting part are integrally formed.

7. The sensing structure of claim 6, wherein the connecting part connects a distal end of each of the first and second extending parts to each other.

8. The sensing structure of claim 1, wherein the at least one opening includes:
 a first opening; and
 a second opening spaced apart from the first opening in a first direction, wherein the second opening extends parallel to the first opening.

9. The sensing structure of claim 8, wherein the first wire includes:
 a first extending part located adjacent to the first opening;
 a second extending part located between the first opening and the second opening; and a third extending part located adjacent to the second opening.

10. The sensing structure of claim 9, wherein the first wire further includes a connecting part connecting the first, second, and third extending parts to each other, and
wherein the first extending part, the second extending part, the third extending part, and the connecting part are integrally formed.

11. The sensing structure of claim 10, wherein the connecting part connects a distal end of each of the first, second, and third extending parts to each other.

12. The sensing structure of claim 1, wherein the substrate further includes a pad area,
wherein the peripheral area includes a first peripheral area and a second peripheral area located between the first peripheral area and the pad area,
wherein the first wire has a third width, extending in a first direction, located in the second peripheral area and a fourth width, extending in the first direction, located in the first peripheral area, and
wherein the fourth width is greater than the third width.

13. The sensing structure of claim 12, wherein the at least one opening is formed in a portion of the first wire located in the first peripheral area, and the at least one opening is not formed in a portion of the first wire located in the second peripheral area.

14. The sensing structure of claim 12, wherein the first wire extends from the pad area in a second direction crossing to the first direction, and a width, extending in the first direction, of the first wire gradually increases as a distance from the pad area increases in the second direction.

15. The sensing structure of claim 14, wherein when the first wire extends from the pad area into the first peripheral area by passing through the second peripheral area and the width of the first wire in the first peripheral area is greater than a predetermined width, the at least one opening is formed in a portion of the first wire located in the first peripheral area.

16. The sensing structure of claim 15, Wherein the portion of the first wire located in the first peripheral area includes:
a first extending part located adjacent to a first side of the at least one opening;
a second extending part located adjacent to a second side of the at least one opening; and
a connecting part connecting the first and second extending parts to each other, and
wherein the first extending part, the second extending part, and the connecting part are integrally formed.

17. The sensing structure of claim 16, wherein the connecting part connects a distal end of each of the first and second extending parts to each other.

18. The sensing structure of claim 1, wherein
the second wire is disposed between the first wire and the substrate,
wherein an upper surface of the second wire is exposed by the at least one opening.

19. The sensing structure of claim 18, wherein a thickness of the first wire is thicker than a thickness of the second wire.

20. The sensing structure of claim 1, further including:
a dummy wire disposed in the peripheral area of the substrate, wherein the dummy wire is spaced apart from the first wire, and has at least one opening.

* * * * *